United States Patent
Sugitani

[11] Patent Number: 5,983,157
[45] Date of Patent: Nov. 9, 1999

[54] APPARATUS FOR DETECTING QUANTITY OF VEHICLE MOTION

[75] Inventor: Nobuyoshi Sugitani, Susono, Japan

[73] Assignee: Toyota Jidosha Kabushiki Kaisha, Japan

[21] Appl. No.: 08/967,307

[22] Filed: Oct. 21, 1997

[30] Foreign Application Priority Data

Oct. 24, 1996 [JP] Japan .................................. 8-282206

[51] Int. Cl.$^6$ .............................. G06F 19/00; G01D 5/26
[52] U.S. Cl. ............................. 701/207; 701/23; 701/28; 701/300; 180/169; 702/150
[58] Field of Search ................ 701/23, 28, 207, 701/300; 318/587; 180/167, 169; 356/3, 27, 138; 702/141, 142, 150, 151

[56] References Cited

U.S. PATENT DOCUMENTS

| | | | |
|---|---|---|---|
| 4,729,660 | 3/1988 | Tsumura et al. ........................... | 701/23 |
| 4,847,774 | 7/1989 | Tomikawa et al. ........................ | 701/23 |
| 5,014,204 | 5/1991 | Kamimura et al. ....................... | 701/23 |
| 5,220,508 | 6/1993 | Ninomiya et al. ........................ | 701/28 |
| 5,318,143 | 6/1994 | Parker et al. .............................. | 701/23 |
| 5,771,485 | 6/1998 | Echigo ...................................... | 701/28 |
| 5,875,408 | 2/1999 | Bendett et al. ............................ | 701/23 |

FOREIGN PATENT DOCUMENTS

| | | |
|---|---|---|
| 52-26880 | 2/1977 | Japan . |
| 55-116285 | 9/1980 | Japan . |
| 2-57486 | 2/1990 | Japan . |

*Primary Examiner*—Gary Chin
*Attorney, Agent, or Firm*—Finnegan, Henderson, Farabow, Garrett & Dunner, L.L.P.

[57] ABSTRACT

A detecting apparatus which detects a quantity of various kinds of vehicle motion without using materials arranged on a road surface. The detecting apparatus is provided on a vehicle. A marking mechanism provides a mark on a road surface, the marking mechanism provided on the vehicle. An imaging device takes images of the road surface including the mark at a predetermined time interval. A quantity of vehicle motion is calculated by detecting a change in a position of the mark during the predetermined time interval based on a plurality of the images.

8 Claims, 17 Drawing Sheets

DIRECTION OF MOVEMENT

APPARATUS FOR DETECTING QUANTITY OF VEHICLE MOTION

BACKGROUND OF THE INVENTION

1. Field of the Invention

The present invention relates to an apparatus for detecting a quantity of vehicle motion and, more particularly, to a detecting apparatus for detecting the quantity of various kinds of vehicle motion.

2. Description of the Related Art

Conventionally, an apparatus for detecting motion of a vehicle by an optical method has been suggested. For example, Japanese Laid-Open Patent Application No. 52-26880 discloses a system for detecting speed and position of a vehicle in which an optical guide is arranged on a ground side and an optical source and optical receivers are provided on the vehicle, a detection being based on a duration of reception of a light by the optical receivers and a position at which the light is received.

In the conventional apparatus, since the optical guide must be arranged on the ground side, the system is expensive. Additionally, information obtained by the conventional apparatus is limited to the speed and position of a vehicle and, thus, it is insufficient for practical use.

SUMMARY OF THE INVENTION

It is a general object of the present invention to provide an apparatus for detecting a quantity of vehicle motion in which the above-mentioned disadvantages are eliminated.

A more specific object of the present invention is to provide an apparatus for detecting a quantity of various kinds of vehicle motion by providing the apparatus on the vehicle without using materials arranged on a road surface.

FIG. 1 is a block diagram for explaining a principle of the present invention. As shown in FIG. 1, there is provided according to the present invention a detecting apparatus for detecting a quantity of vehicle motion, the detecting apparatus being provided on the vehicle, the detecting apparatus comprises:

a marking mechanism (M1) for providing a mark on a road surface, the marking mechanism provided on the vehicle;

an imaging device (M2) for taking images of the road surface including the mark at a first predetermined time interval;

calculating means (M3) for calculating a quantity of vehicle motion by detecting a change in a position of the mark during the predetermined time interval based on a plurality of the images.

According to the above-mentioned invention, a quantity of vehicle motion is calculated by a change in a position of the mark on the road surface in the image taken by the imaging device. Thus, the quantity of vehicle motion relative to the road surface can be accurately detected. Additionally, the mark is provided by the marking mechanism which is provided on the vehicle. Thus, there is no need to provided an infrastructure on the road surface, resulting in a reduced cost.

The calculating means may calculate information with respect to vehicle speed and moving direction of the vehicle based on a plurality of the images, each of which includes at least the same mark.

Additionally, the calculating means may calculate information with respect to spin and revolution of the vehicle based on a plurality of the images, each of which includes at least the same two marks.

According to this invention, information with respect to spin and information with respect to roll can be calculated separately which cannot be achieved by a conventional yaw rate sensor. An external disturbance such as influence of a side wind may be assumed by such information.

Additionally, the calculating means may calculate information with respect to height, a pitch and roll of the vehicle based on a plurality of the images, each of which includes at least the same three marks.

According to this invention, information with respect to the quantity of three-dimensional vehicle motion, such as information with respect to height, pitch and roll of the vehicle, can be obtained.

The marking mechanism may include a laser beam source which projects a laser beam onto the road surface so as to provide the mark on the road surface.

According to this invention, since the mark is provided on the road surface as a spot irradiated by the laser beam, the mark can be provided without pollution of the road surface.

In one embodiment according to the present invention, the laser beam source may be an infrared laser beam which projects an infrared laser beam so as to provide a heat point as the mark, and the imaging device taking infrared images of the road surface including the heat point.

Additionally, in the present invention, the marking mechanism may provide a plurality of marks on the road surface at a second predetermined time interval which is changed in proportion to speed of the vehicle.

According to this invention, a distance between adjacent marks in the image taken by the imaging device can be substantially constant when speed of the vehicle is changed. Thus, a plurality of marks can always be included in each of the images taken by the imaging device.

The second predetermined time interval may be decreased as the speed of the vehicle is increased.

Other objects, features and advantages of the present invention will become more apparent from the following detailed description when read in conjunction with the accompanying drawings.

BRIEF DESCRIPTION OF THE PREFERRED EMBODIMENTS

DETAILED DESCRIPTION OF THE PREFERRED EMBODIMENT

Figure 1:
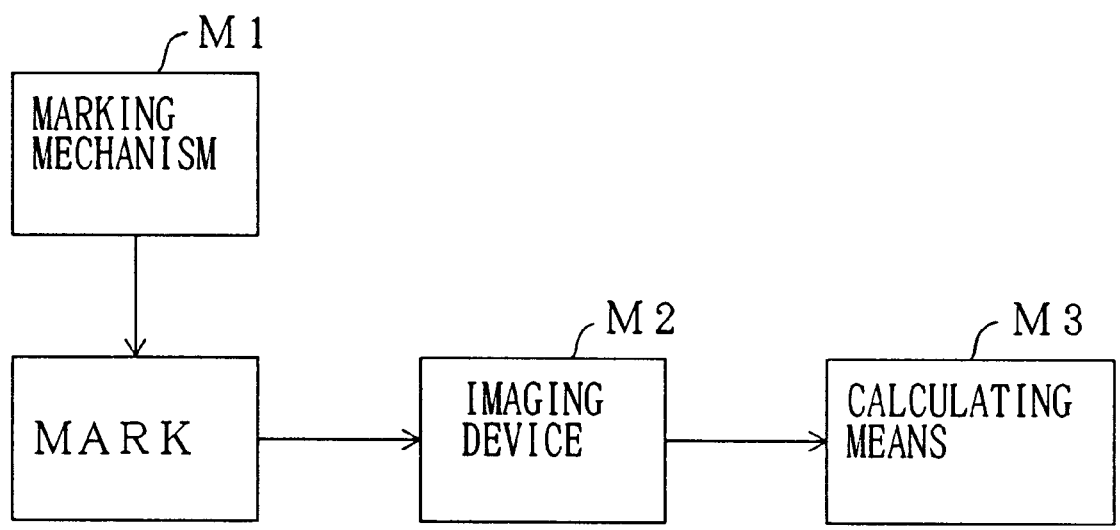
FIG. 1 is a block diagram of an apparatus according to the present invention.
Figure 2:
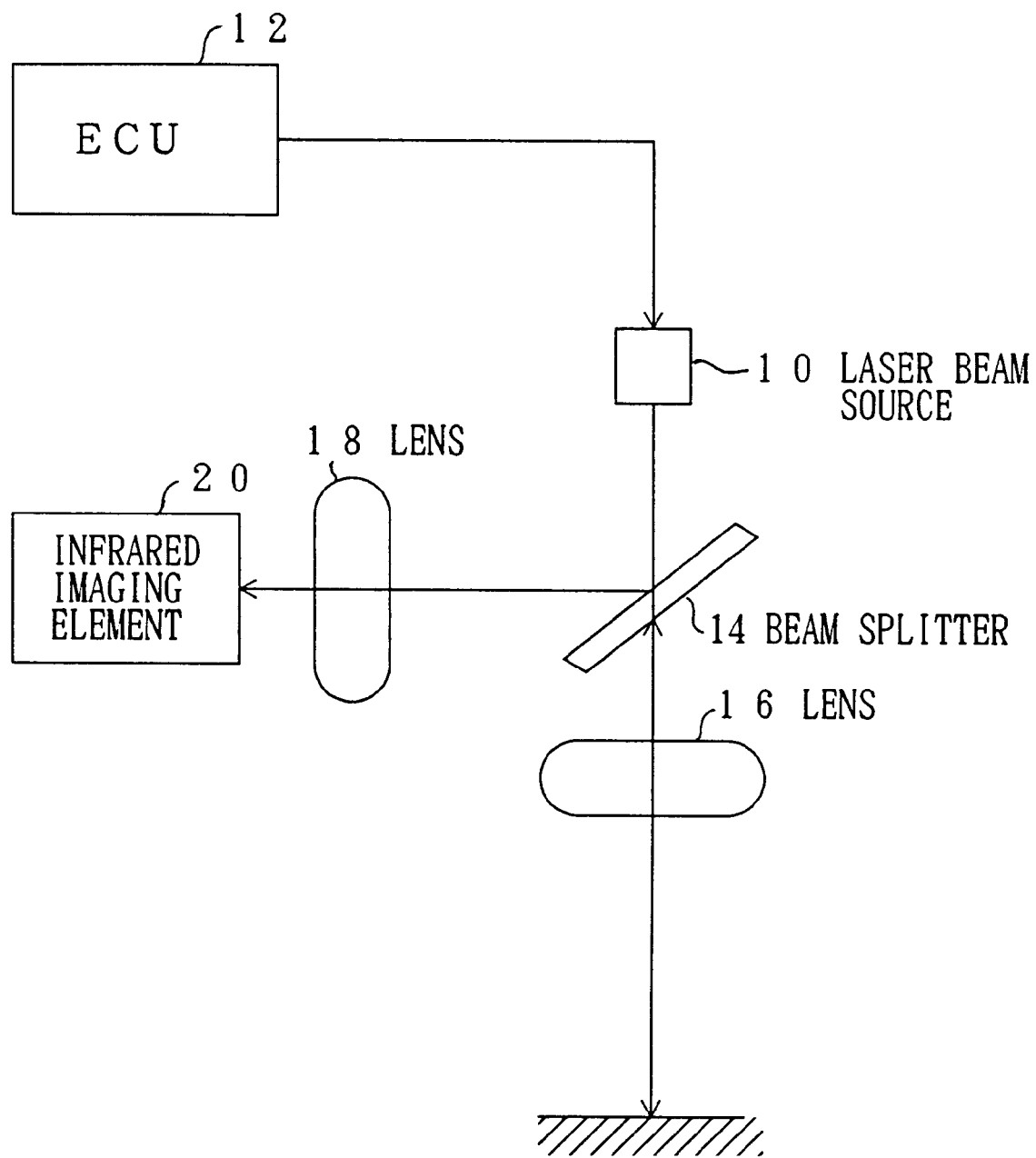
FIG. 2 is an illustration of a system structure according to an embodiment of the present invention.

FIG. 2 is an illustration of a system structure according to an embodiment of the present invention. In the figure, a laser beam source 10 as the marking means M1 is a laser diode which emits, for example, an infrared laser beam. The laser beam source 10 emits a pulsed laser beam by being controlled by an electronic control unit (ECU) 12. The laser beam emitted by the laser beam source 10 transmits a beam splitter 14, and is projected to a road surface by being passed through a lens 16. An image of the road surface passes through the lens 16, and directed to an infrared imaging element 20. The image of the road surface is focused by a lens 18 on the infrared imaging element 20 such as an IR-CCD as the imaging means M2. The image data output from the infrared imaging element 20 is supplied to the ECU 12 as the calculating means M3. All elements from the laser beam source 10 to the infrared imaging elements 20 are provided on a vehicle.

Figure 3:
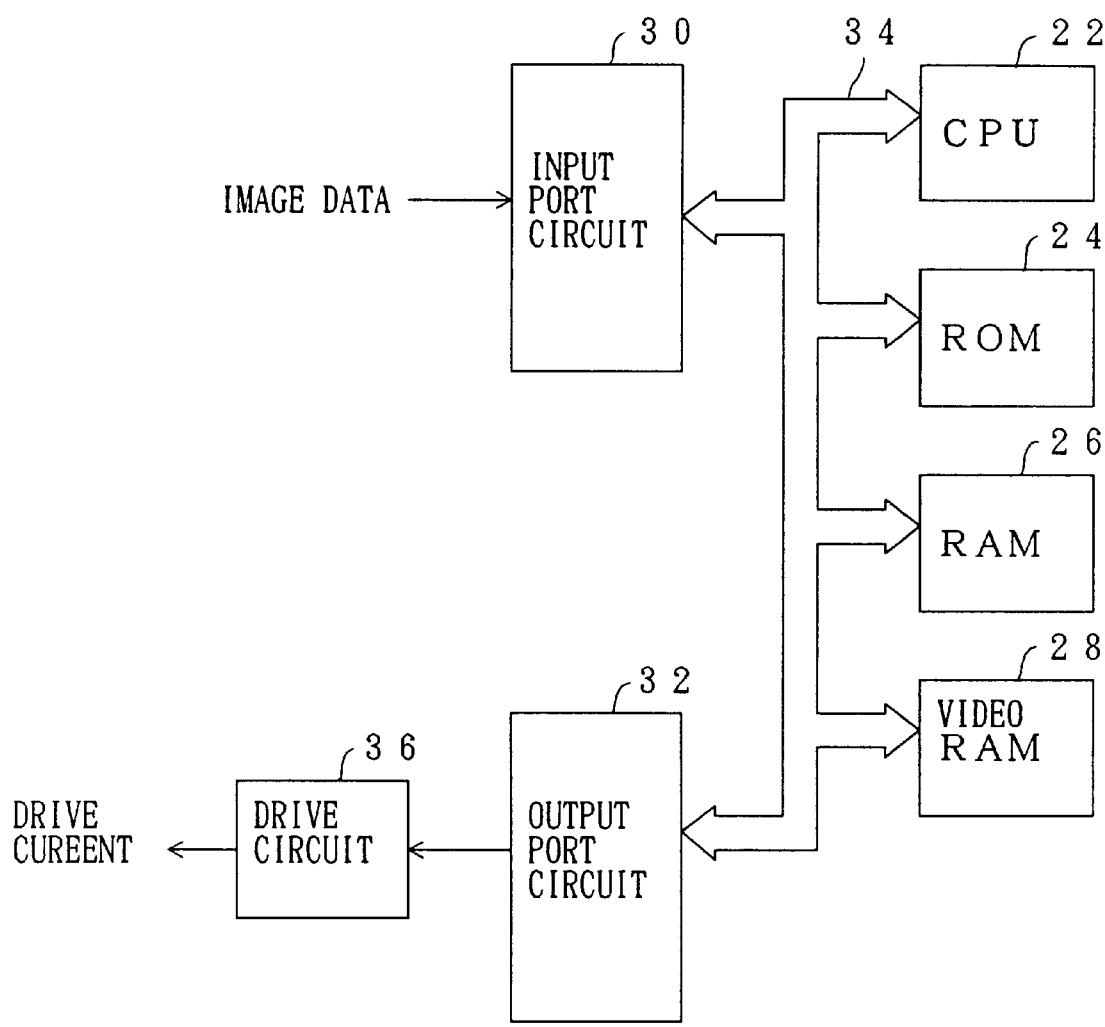
FIG. 3 is a block diagram of an electronic control unit shown in FIG. 2.

The electronic control unit 12 comprises a microcomputer as shown in FIG. 3. The electronic control unit 12 comprises a central processing unit (CPU) 2, a read only memory (ROM) 24, a random access memory (RAM) 26, a video random access memory (video RAM) 28, an input port circuit 30 and an output port circuit 32, all of which are interconnected by a common bus 34.

An image data is supplied to the input port circuit 30 from the infrared imaging element 20. The image data is stored in the video RAM 28. The CPU 22 performs various calculations in accordance with control programs stored in the RAM 24 by using the RAM 26 as a work area. Additionally, the CPU 22 supplies a control signal to a drive circuit 36 via the output port circuit 32 so that a drive current is supplied from the drive circuit 36 to the laser beam source 10.

Figure 4A:
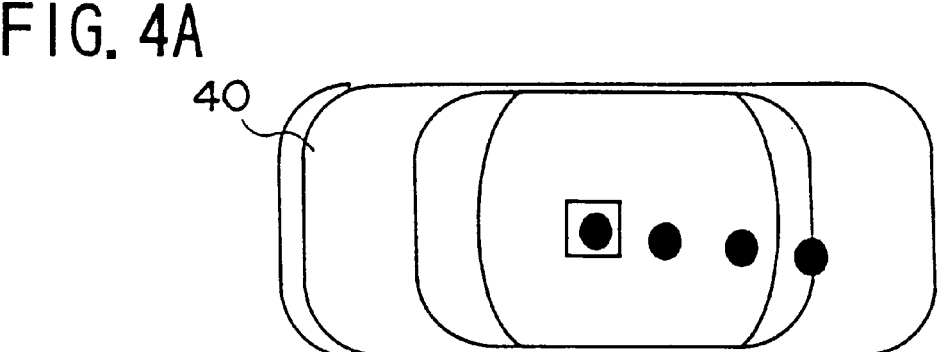
FIG. 4A is a plan view of a vehicle provided with the apparatus according to the embodiment of the present invention, marks being provided on a road surface by the apparatus.
Figure 4B:
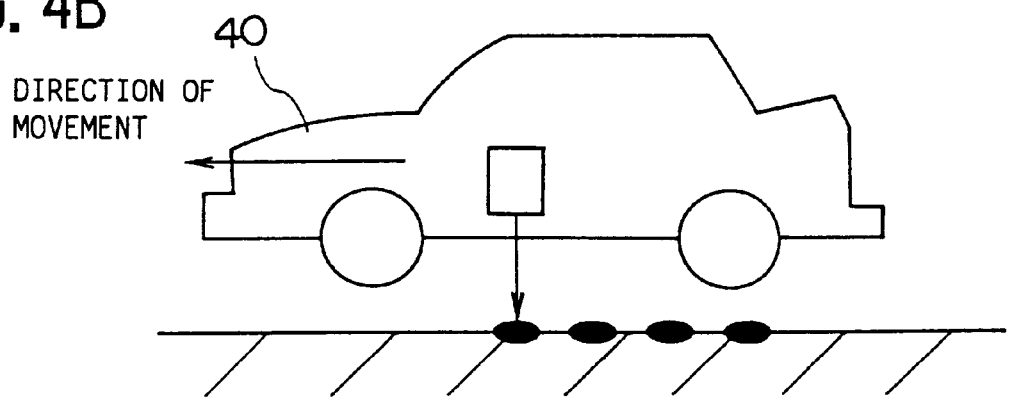
FIG. 4B is a side view of the vehicle shown in FIG. 4A.
Figure 5:
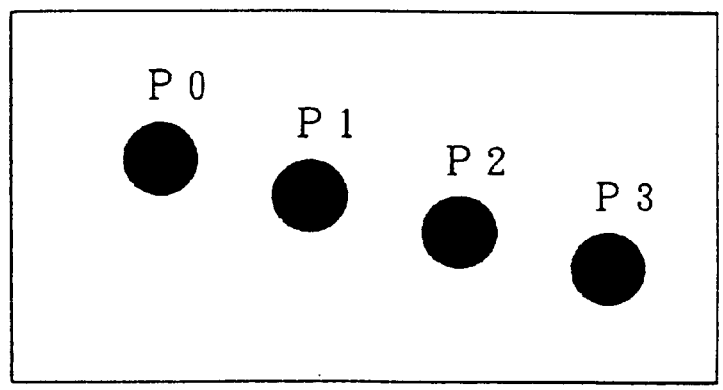
FIG. 5 is an illustration of the marks shown in FIGS. 4A and 4B.

When an infrared beam is projected by the laser beam source 10, temperature of the irradiated spot on the road surface is increased. This irradiated spot on the infrared image is marked as a heat point. Thus, if a pulsed infrared laser beam is projected to the road surface when the vehicle is moving, a plurality of marks having a temperature higher than the surrounding area are formed on the road surface as shown in FIGS. 4A and 4B as the vehicle 40 moves. Accordingly, an infrared video image of heat points P0 to P3 is obtained as shown in FIG. 5.

A description will now be given of a case in which vehicle motion information is obtained from two images taken with respect to a single heat point, the two images being taken at different times during a time interval $\Delta t$. In the synthesized image of the two images shown in FIG. 6, a point P0' indicates a heat point of the image at a time t0, and a point P0 indicates a heat point of the image at a time interval $\Delta t$ since the time t0. A vehicle speed V as information of a relative speed with respect to the ground and a moving direction $\theta$ as information of a direction of the travel are represented by the following relationships (1) and (2), where $P_0'=(P_{0x}', P_{0y}')$ and $P0=(P_{0x}, P_{0y})$ are X and Y coordinate values of the points $P_0'$ and $P_0$.

$$P_{0x} - P_{0x}' = V \cdot \Delta t \cdot \sin\theta \quad (1)$$

$$P_{0y} - P_{0y}' = V \cdot \Delta t \cdot \cos\theta$$

$$\therefore \theta = \tan^{-1}\left(\frac{P_{0x} - P_{0x}'}{P_{0y} - P_{0y}'}\right)$$

Since the vehicle speed V of the vehicle is obtained when the Y-axis is $\theta$, and generally $(P_{0y}-P_{0y}')>>(P_{0x}-P_{0x}')$ the following relationship is obtained.

$$V = \frac{1}{\Delta t} \cdot \frac{P_{0y} - P_{0y}'}{\cos\theta} \quad (2)$$

Additionally, an acceleration a is represented by the following equation, where $V_0$ is a vehicle speed at the time $t_0$.

$$\alpha = (V - V_0)/\Delta t \quad (3)$$

A distance X of travel of the vehicle can be obtained by integrating $V \cdot \Delta t$.

Figure 7:
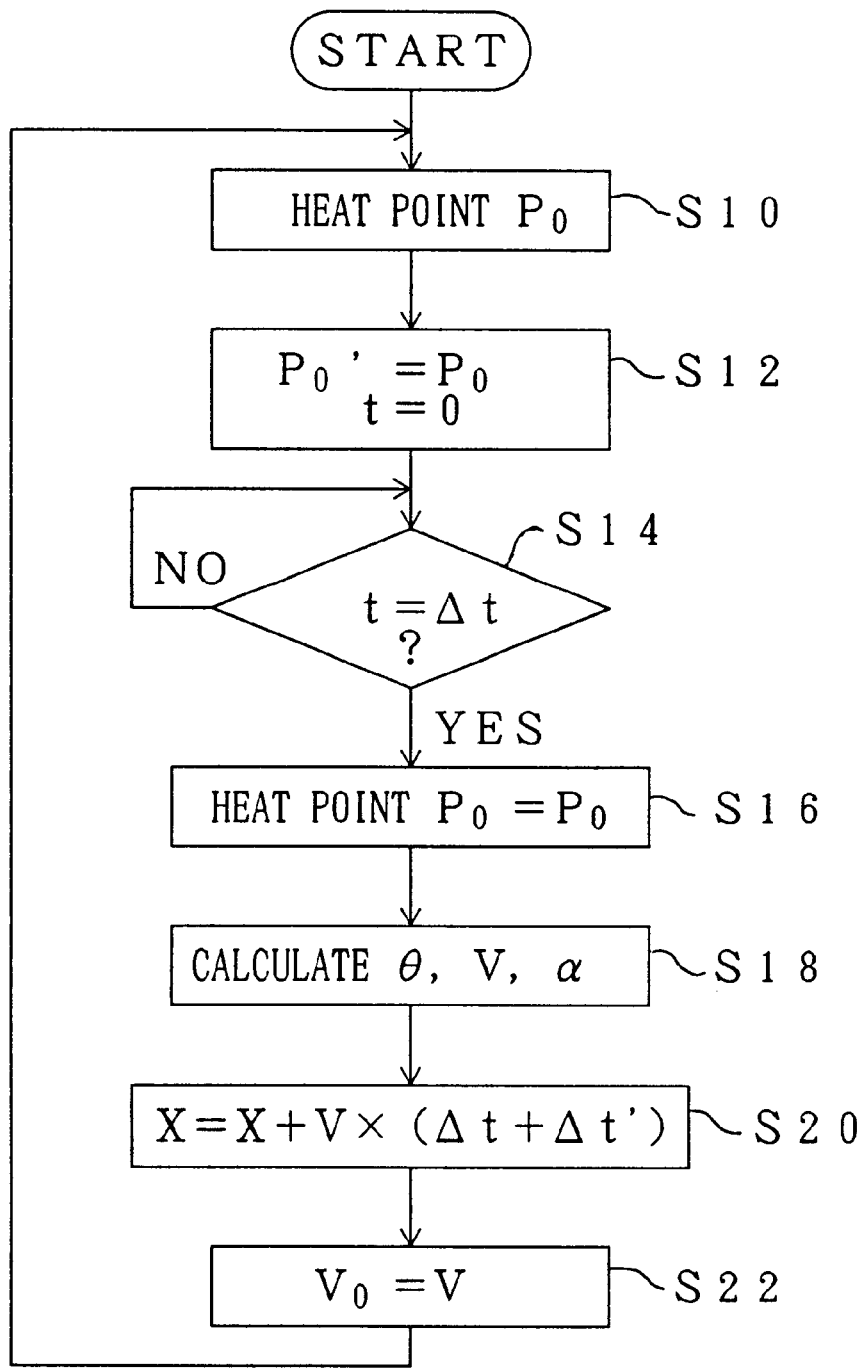
FIG. 7 is a flowchart of an operation of an ECU shown in FIG. 2 for calculating a quantity of vehicle motion by referring to a single heat point.

FIG. 7 is a flowchart of an operation of the ECU 12 for calculating a quantity of vehicle motion by referring to a single heat point. In the operation shown in the figure, the heat point $P_0$ is formed, in step S10, by supplying a pulsed current to the laser beam source 12. Then, the image data is read from the infrared imaging element 20 in step S12, and the X and Y coordinate values of the heat point P0 on the image are stored as data of the heat point $P_0'$. Additionally, a timer t is reset to zero.

Thereafter, in step S14, the count of the timer t is continued until the count value reaches the unit time $\Delta t$, and the routine proceeds to step S16. In step S16, image data is read from the infrared imaging element 20, and the X and Y coordinate values of the heat point on the image is regarded as the heat point $P_0$. Then, in step S18, calculations are performed by using the equations (1), (2) and (3) so as to obtain the moving direction $\theta$, the vehicle speed V and the acceleration $\alpha$. Thereafter, in step S20, the travel distance X is calculated based on the following equation. It should be noted that a time $\Delta t'$ is time spent for executing the process of steps S10 and S12.

$$X = X + V_x(\Delta t + \Delta t')$$

Then, the routine returns to step S10 after the vehicle speed V is set to the vehicle speed $V_0$ which was obtained in the last or previous cycle.

As mentioned above, since the quantity of vehicle motion is detected by a change in the heat point formed on the road surface with respect to time, the quantity of vehicle motion relative to the road surface can be accurately detected, and there is no need to provide infrastructure on the road side, resulting in decrease in the cost. Additionally, both the information of the vehicle speed and the information of the moving direction can be calculated from the single heat point. Additionally, the acceleration and the travel distance can be obtained from the information of the vehicle speed. Additionally, since the heat pint if formed as a mark on the road surface by the infrared laser beam so as to detect the mark by the infrared image, the mark can be formed without pollution of the road surface.

It should be noted that in the present embodiment, although the calculation of θ, V and α is performed based on the positions of the heat points P0' and P0, these values may be obtained from the adjacent heat points P0 and P1 shown in FIG. 5.

It is assumed that V·Δt corresponds to a travel distance x (x=V·Δt). The travel distance x changes with respect to time as shown by marks x. The change is caused by a change in angles of each of the laser beam and an optical axis of the imaging element with respect to the road surface due to pitching and rolling of the vehicle. A natural frequency of the vehicle is determined by a spring constant of a suspension mechanism and a weight supported by the spring, and amplitude of the pitching and rolling is increased at the natural frequency. The weight supported by the spring varies depending on the number of passengers and weight of luggage loaded on the vehicle.

The value of the natural frequency is about 1 Hz.

$$X(k) = \sum_{n=0}^{N-1} x(n) \cdot \exp\left\{\frac{-j \cdot 2\pi \cdot n \cdot k}{N}\right\}$$

$$(k = 0, 1, \ldots, N-1)$$

Figure 8A:
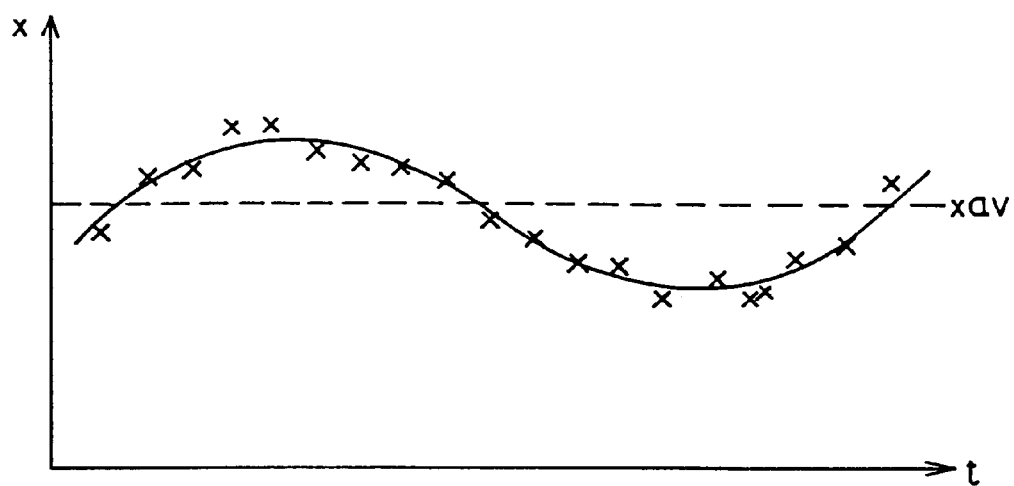
FIG. 8A is a graph showing a change in a position of a heat point.
Figure 8B:
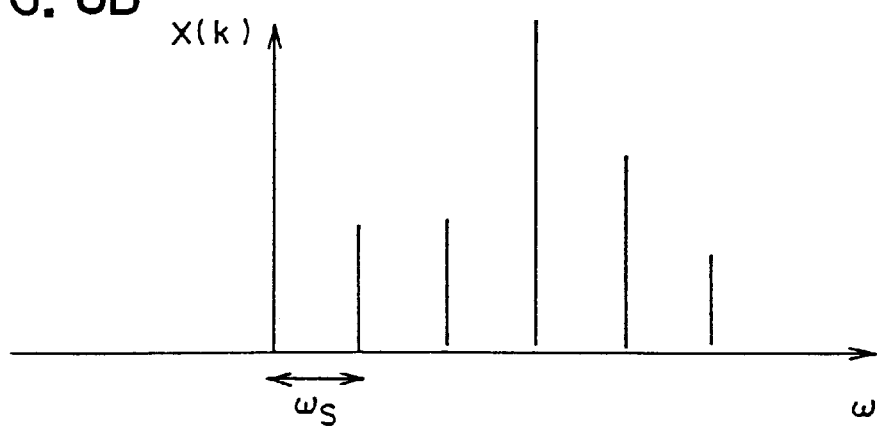
FIG. 8B is a spectrum diagram of a distance signal sampled at a predetermined time interval.

It is assumed that a signal X(k) is a value which is obtained by performing discrete Fourier transform (DFT) on a signal x(n) which is sampled at uniform intervals. It should be noted that ω=(2π/τ)·k. The signal X(K) is represented by the following equation, where the number of samples is N (0≦k≦N−1), and spectrum of the signal X(k) is represented as shown in FIG. 8B in which the spectrum lines have intervals of ωs=2π/τ.

When a frequency range to be obtained is known, X(k) to be obtain ed is included within the frequency range. The amplitude and natural frequency of a frequency component can be obtained by the maximum value and a value k of X(k).

$$f_{min} < f < f_{max}$$

$$\because \omega = 2\pi f \quad k = (\omega \cdot \tau)/2$$

$$k_{min} = \text{Round Down} (f_{min} \cdot \tau)$$

(an integer obtained by rounding down $f_{min} \cdot \tau$)

$$k_{min} = \text{Round Up} (f_{max} \cdot \tau)$$

(an integer obtained by rounding UP $f_{min} \cdot \tau$)

The number N of samples must be a value greater than $k_{max} \neq 1$. A time period for the measurement must be τ·(N−1). Then X($k_{min}$) to X($k_{max}$) are calculated. The maximum value Max[X(k)] of X(k) within that range corresponds to an amplitude (quantity of roll and pitch). The natural frequency f (=k/τ) is obtained by k providing the maximum value.

Figure 6:
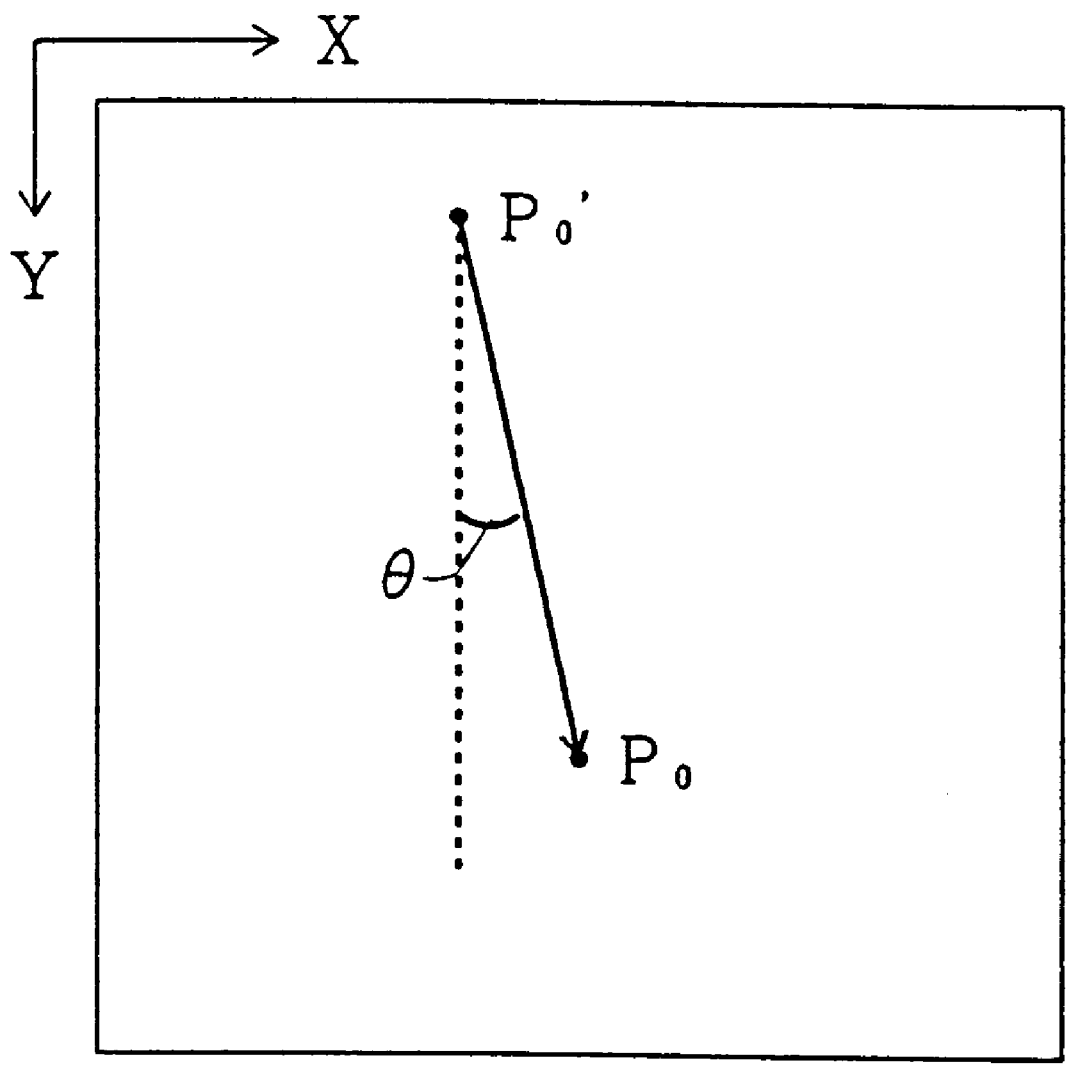
FIG. 6 is an illustration for explaining an image of the mark taken by an infrared imaging element shown in FIG. 2.

Referring to FIG. 6, $V_y=(P_{0y}-P_{0y}')$, $V_x=(P_{0x}-P_{0x}')$, τ=Δt. Then, P(k) and R(k) are obtained based on N number of $V_y(n)$ and N number of $V_x(n)$.

$$P(k) = \sum_{n=0}^{N-1} V_y(n) \cdot \exp\{-j \cdot 2\pi \cdot n \cdot k/N\}$$

$$R(k) = \sum_{n=0}^{N-1} V_x(n) \cdot \exp\{-j \cdot 2\pi \cdot n \cdot k/N\}$$

In the above equations, the following maximum values of P(k) and R(k) correspond quantity P of pitching and quantity R of rolling, respectively, within k=$k_{min}$ to $k_{max}$.

P=Max [P(k)]
R=Max [R(k)]

It is assumed that $k_P$ and $k_R$ are set to k when the above P and R is obtained, the natural frequencies $f_P$ and $f_R$ of the pitch and roll, respectively, are obtained as $f_P=k_P/\tau$ and $f_P=k_R/\tau$.

Figure 9:
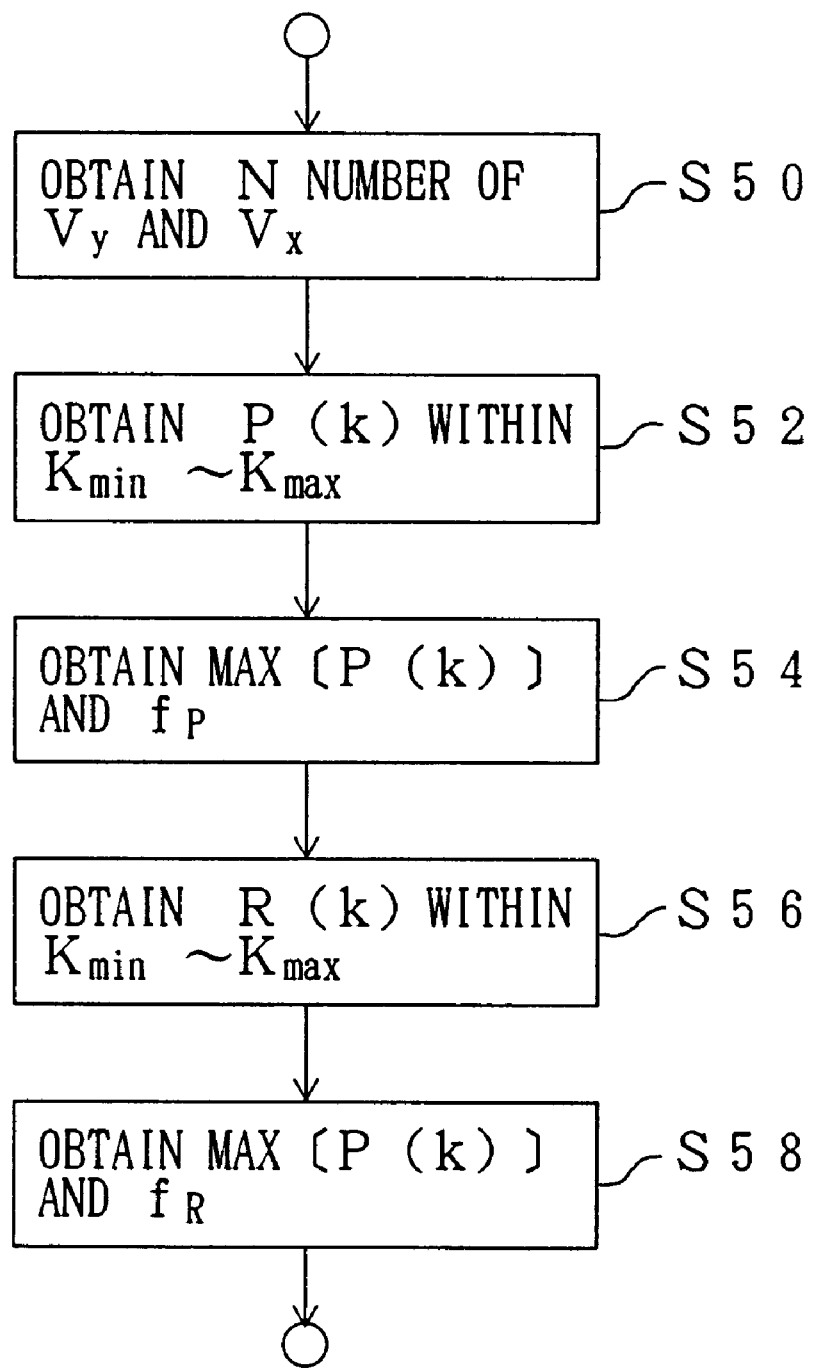
FIG. 9 is a flowchart of an operation performed by the ECU for obtaining a quantity of pitch and roll motion.

FIG. 9 is a flowchart of an operation performed by ECU 12 for obtaining the quantity of pitch and roll. In the figure, in step S50, consecutive N numbers of Vy and Vx are obtained. Then, in step S52, P(k) between $K_{min}$ and $k_{max}$ is obtained. Thereafter, in step S54, the maximum value of P(k) is set to the quantity P of the pitch so as to obtain the natural frequency $f_P$ of pitch by k at that time. Then, similarly, in step S56, R(k) between $K_{min}$ and $k_{max}$ is obtained. Thereafter, in step S58, the maximum value of R(k) is set to the quantity R of roll so as to obtain the natural frequency $f_P$ of roll by k at that time.

The moving direction θ shown in FIG. 6 is not always equal to zero when the vehicle is moving straight due to accuracy of mounting the imaging element 20. In order to eliminate this problem, the moving direction θ is averaged when the vehicle is moving with a steering angle of zero degrees so that a correction may be performed to set the average value to zero.

Additionally, the differential value θ/dt of the moving direction θ can be used as a yaw rate. A slip angle ($\theta_H-\theta$) of tire can be obtained by subtracting the moving direction θ from a steering angle $\theta_H$ of a wheel.

When there is a difference between a vehicle speed $V_S$ which is detected by a vehicle speed sensor and the vehicle speed V obtained by the equation (2), it is considered that one of the causes is a change in the air pressure in the tire since the vehicle speed sensor assumes the vehicle speed based on a speed of rotation of the wheel or a wheel axis. Additionally, it is considered that another cause is an inclination of the vehicle with respect to the road surface due to an unbalanced weight distribution to rear and front wheels due to an inclination of a slope.

Figure 10:
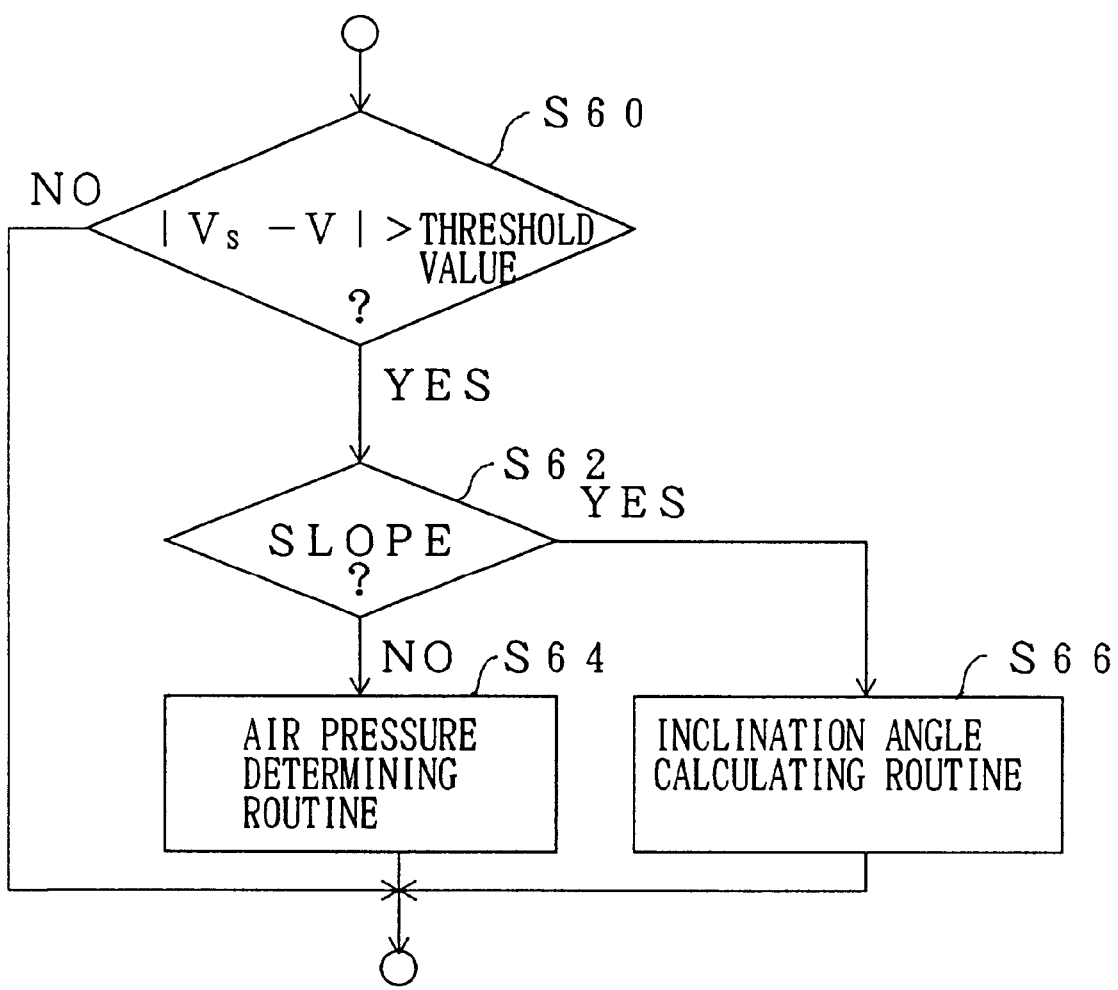
FIG. 10 is a flowchart of an operation performed by the ECU for determining an inclination angle of a slope.

The air pressure in the tire and the inclination of the road surface can be determined by performing an operation shown in FIG. 10 of the ECU 12. In FIG. 10, it is determined, in step S60, whether or not an absolute value of the difference between the vehicle speed VS and the vehicle speed V exceeds a predetermined threshold value. If the absolute value of the difference does not exceed the predetermined threshold value, the routine is ended. If the absolute value of the difference exceeds the predetermined threshold value, it is determined whether or not the vehicle moving on a slope. In this step, it is determined whether the slope is an uphill slope or a downhill slope in accordance with a relationship between an opening degree of an accelerator and the vehicle speed VS. If it is determined that the road is not a slope, the routine proceeds to step S64 so as to perform a tire air pressure determining routine. In this routine, the vehicle speed VS and the vehicle speed V are obtained when the opening degree of the accelerator is substantially constant and the vehicle speed is substantially constant. VS and V are compared with each other so as to determine the air pressure of the tire based on the value of VS−V. On the other hand, if the road is a slope, the routine proceeds to step S66 to perform an inclination angle calculating routine. In this routine, the vehicle speed VS and the vehicle speed V are obtained so as to calculate the inclination angle based on the value of VS−V.

In a car navigation system, it is required to accurately detect a moving direction of a vehicle. It is difficult to detect an accurate direction by a compass due to external noise. A method using a GPS has a position error of about a few hundred meters, it cannot accurately detect a moving direction within a narrow range. Accordingly, in practice, a matching (map matching) with map data is performed by calculating the moving direction based on a combination of travel distance and information obtained by the compass and the GPS, the travel distance being obtained by a steering angle and a vehicle speed. If the moving direction θ of the vehicle which is obtained in the above mentioned embodiment is used instead of the steering angle, a more accurate navigation can be achieved since the moving direction θ represents an actual moving direction of the vehicle.

Figure 11A:
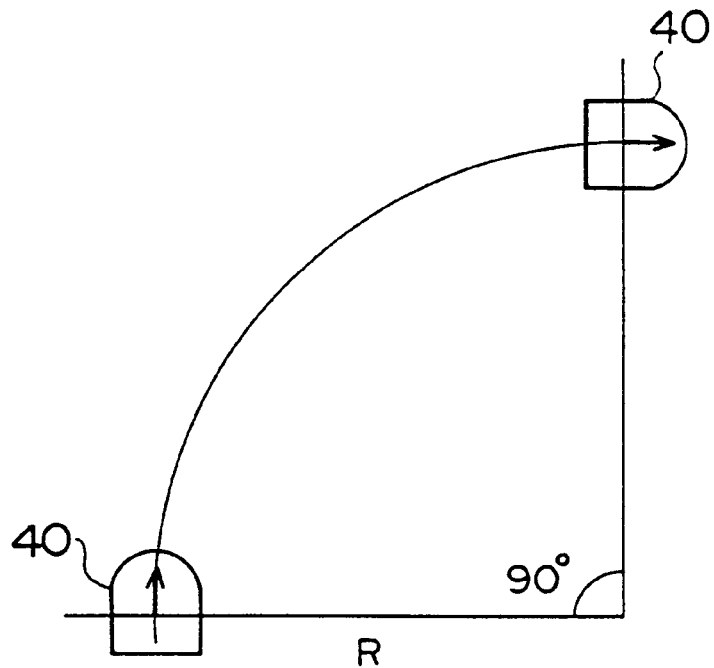
FIG. 11A is an illustration of a movement of a vehicle when the vehicle turns.

As shown in FIG. 11A, when a vehicle 40 moves along a curve having a radius R so that the vehicle 40 revolves an angle of 90 degrees, the vehicle 40 itself spins 90 degrees resulting in a 90-degree change in the moving direction. The revolution and the spin of the vehicle 40 are different motions. However, since a conventional yaw rate sensor detects a yaw rate by using a Coriolis force, both the revolution and the spin are detected simultaneously, and these cannot be detected separately.

Figure 11B:
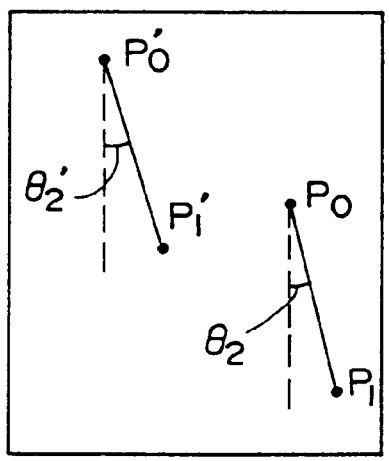
FIG. 11B is an illustration of a synthesized image of two heat points when the vehicle is turning.

If two images are taken at different times with an interval Δt with respect to two heat points, the revolution and spin are detected separately. In a synthesized image shown in FIG. 11B, points $P_0'$ and $P_1'$ are positions of the heat points on the image at a time $t_0$, and points $P_0$ and $P_1$ are positions of the heat points on the image at a time $t_1$ when the unit time Δt has passed. Since the moving direction of the vehicle does not change during a revolution, the fact that a moving direction $θ_2$ at the time $t_1$ is different from a moving direction $θ_2'$ at the time $t_0$ is caused by a spin of the vehicle. Accordingly, a spin angle $θ_S$ as spin information and a spin rate β are represented as follows:

$$\left. \begin{array}{l} θ_s = θ_2 - θ_2' \\ β = \dfrac{θ_s}{Δt} \\ θ_2' = \tan^{-1} \dfrac{P_{1x}' - P_{0x}'}{P_{1y}' - P_{0y}'} \\ θ_2 = \tan^{-1} \dfrac{P_{1x} - P_{0x}}{P_{1y} - P_{0y}} \end{array} \right\} \quad (4)$$

Figure 12A:
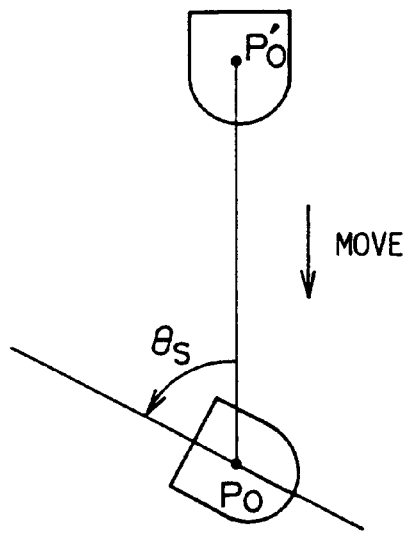
FIG. 12A is an illustration for explaining a spin angle.
Figure 12B:
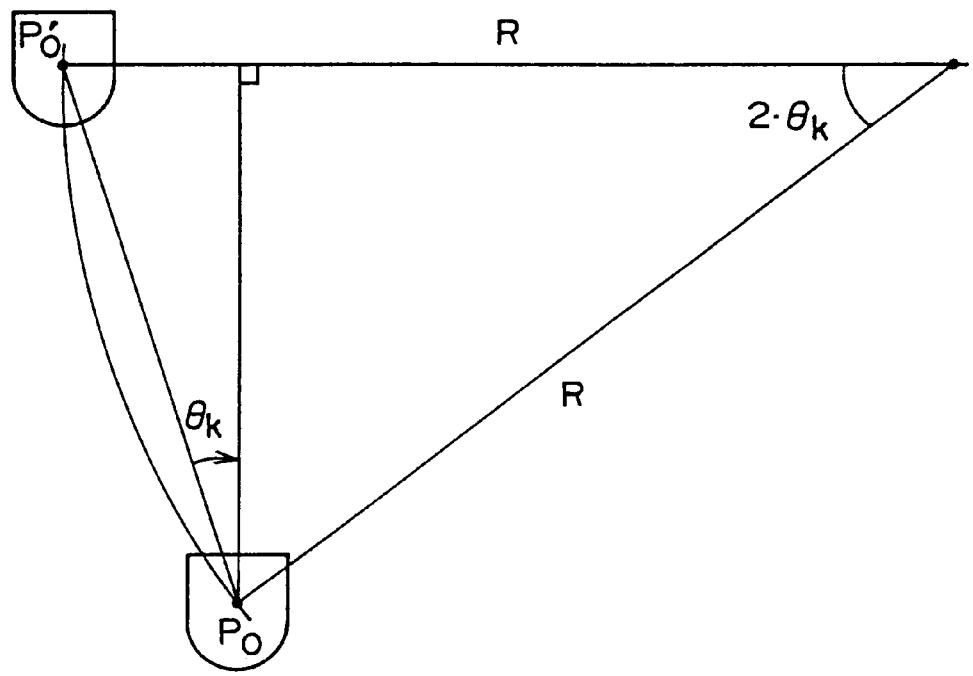
FIG. 12B is an illustration of a revolution angle.

When there is a spin angle θ shown in FIG. 12A and a revolution angle $θ_K$ as information of revolution shown in FIG. 12B, the direction of the spin angle $θ_S$ is opposite to a direction of the revolution angle $θ_K$ as information of revolution. In the image shown in FIG. 11B, an angle θ formed by a center point $(P_0'+P_1')/2$ between the two points $P_0'$ and $P_1'$ at the time $t_0$ and a center point $(P_0+P_1)/2$ between the two points $P_0$ and $P_1$ at the time $t_1$ can be represented as $θ=θ_K−θ_S$ . . . (5). Additionally, the angle θ is represented by the following equation.

$$θ = \tan^{-1} \dfrac{P_{0x} + P_{1x} - P_{0x}' - P_{1x}'}{P_{0y} + P_{1y} - P_{0y}' - P_{1y}'} \quad (6)$$

A distance between the points $P_0'$ and $P_0$, which corresponds to a revolution angle $2θ_k$, is represented by V·ΔΔt. Thus, the radius R is given by the following equation.

$$R = \dfrac{V \cdot Δt}{\sin θ_k} \quad (7)$$

Figure 13:
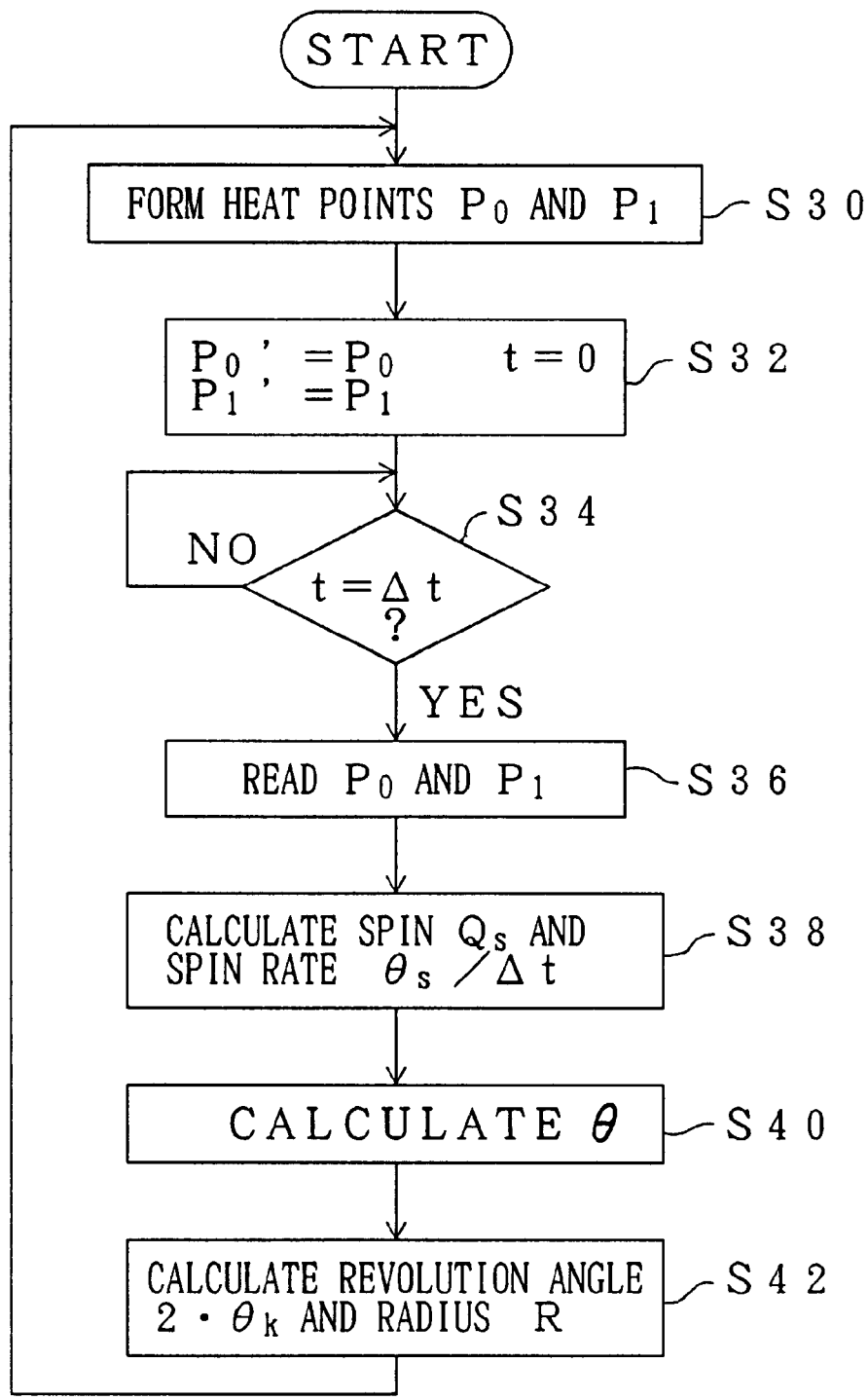
FIG. 13 is a flowchart of an operation performed by the ECU for calculating a quantity of vehicle motion based on two heat points.

FIG. 13 is a flowchart of an operation performed by the ECU 12 for calculating a quantity of vehicle motion based on two heat points. In the figure, heat points $P_0$ and $P_1$ are formed, in step S30, by supplying a pulsed current to the laser beam source 10. Then, in step S32, image data is read from the infrared imaging element 20, and the X and Y coordinate values of the image of the heat points $P_0$ and $P_1$1 are stored as the data of the heat points $P_0'$ and $P_1'$. At this time, the timer t is reset to zero.

Then, in step S34, a counting operation of the timer t is continued until the counted value of the timer t reaches the unit time Δt. When the counted value reaches the unit time Δt (t=Δt), the routine proceeds to step S36. In step S36, image data is read from the infrared imaging element 20, and the X and Y coordinate values of the image of the heat points $P_0$ and $P_1$1 are rendered to be the data of the heat points $P_0$ and $P_1$. In step S38, a quantity $θ_S$ of a spin and a spin rate $θ_S/Δt$ are obtained by performing a calculation of the equation (4). Additionally, in step S40, the angle θ formed by the two center points is obtained by performing a calculation of the equation (6). Further, in step S42, the revolution angle $2·θ_K$ is obtained by the equation (5), and the radius R is obtained by the equation (7). Thereafter, the routine returns to step S30.

As mentioned above, according to the present embodiment, the information of a revolution and a spin of the vehicle, which is not separately detected by the conventional yaw rate sensor, can be detected separately. Thus, an amount of disturbance due to a force such as side wind can be assumed by such information.

Figure 14:
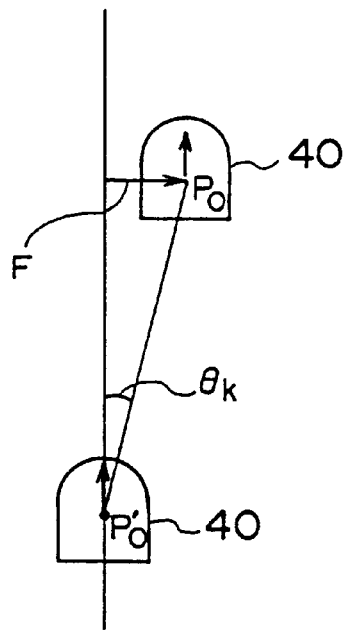
FIG. 14 is an illustration for explaining an influence of a side wind.

As mentioned above, the spin angle $θ_S$ and the revolution angle $2·θ_K$ can be obtained separately, and the radius R of the curve can also be obtained. If a side wind hits the vehicle 40 when the vehicle is moving straight, and the vehicle 40 moves from a position $P_0'$ to a position $P_0$ as shown in FIG. 14, the spin angle $θ_S$ of the vehicle 40 is zero and the revolution angle $2·θ_K$ occurs in the vehicle 40. The side wind force F is proportional to the angle $2·θ_K−θ_S$. That is, an equation $F=k_1(2·θ_K−θ_S)$ is established, where $k_1$ is a constant. As mentioned above, in the present embodiment, the side wind force can also be assumed.

The angle θ shown in FIG. 6 or the angle θ represented by the equation (6) represents an actual moving direction of the vehicle. Thus, the slip angle $θ_{HS}$ of a wheel can be obtained from the following equation by detecting the steering angle $θ_T$ of the tire.

$$θ_{HS} = θ_T − θ$$

It should be noted that the steering angle $θ_T$ of the tire is in a proportional relationship with the steering angle $θ_H$ of a steering wheel ($θ_T = k_2 · θ_H$).

Figure 15:
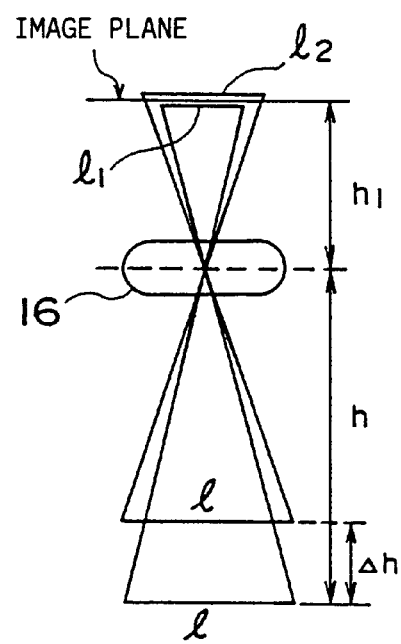
FIG. 15 is an illustration for explaining an influence of a change in a height of a vehicle.
Figure 16:
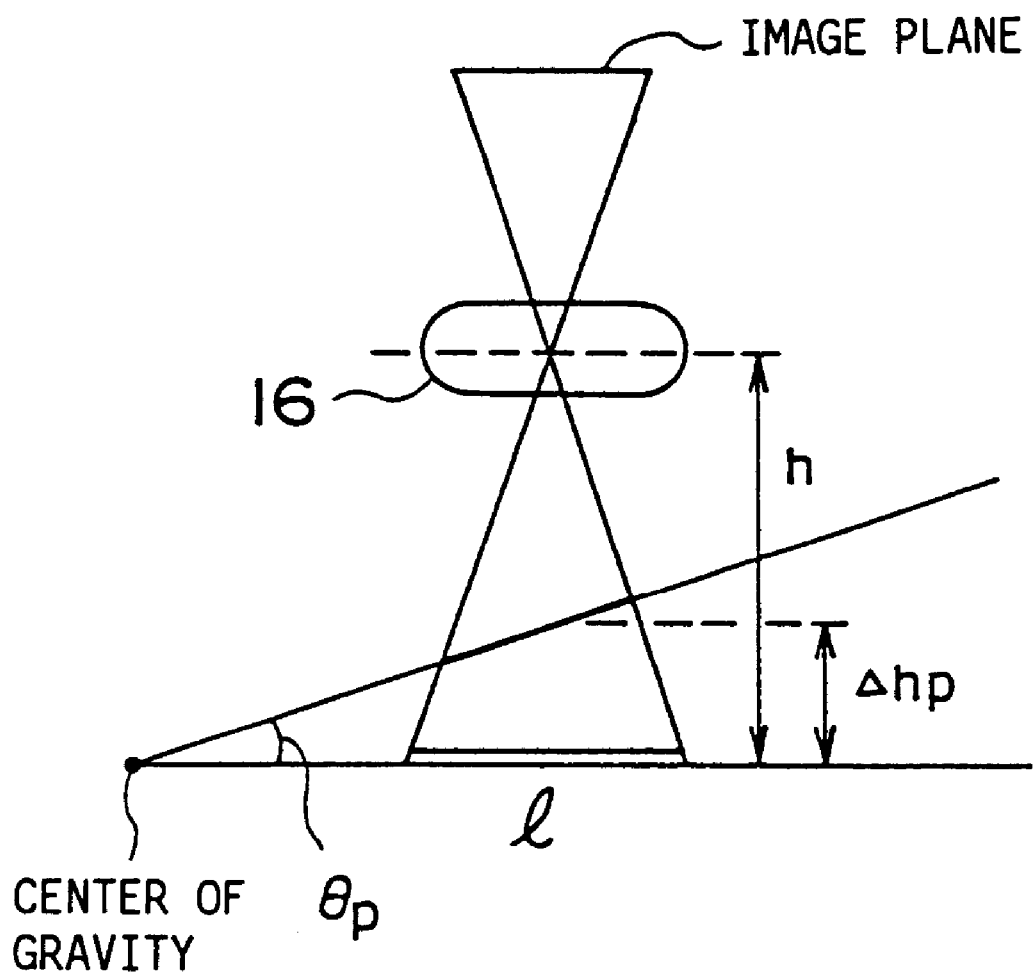
FIG. 16 is an illustration for explaining an influence of a pitch motion.

It is considered that a change in the height of the vehicle, the roll and the pitch of the vehicle are factors which vary the distance between the heat points (for example, the distance between the points $P_0$ and $P_1$) With regard to the change in the height of the vehicle, a line having a length l is focused on an image plane as a line having a length $l_1$ as shown in FIG. 15. If there is a change $\Delta h$, the length on the image plane is represented by the following equation since a focus distance $h_1$ is constant.

$$l_2 = l_1 \times \{h/(h - \Delta h)\}$$

If it is assumed that $h >> \Delta h$, the above equation can be rewritten as follows.

$$l_2 = l_1 \times (1 + \Delta h/h)$$

That is, a length of a line on the image plane is changed in proportional to h/h.

Now, a discussion will be made of a pitch of the vehicle which is a rotation of the vehicle about the center of gravity of the vehicle in a vertical plane. A change due to the pitch is considered to be an inclination of the road surface. Due to the pitch, a height of an object having a length 1 on the round changes by a height $\Delta h_P$ in accordance with a rotational angle $\theta_P$ of the pitching and a distance from the center of gravity.

Figure 17A:
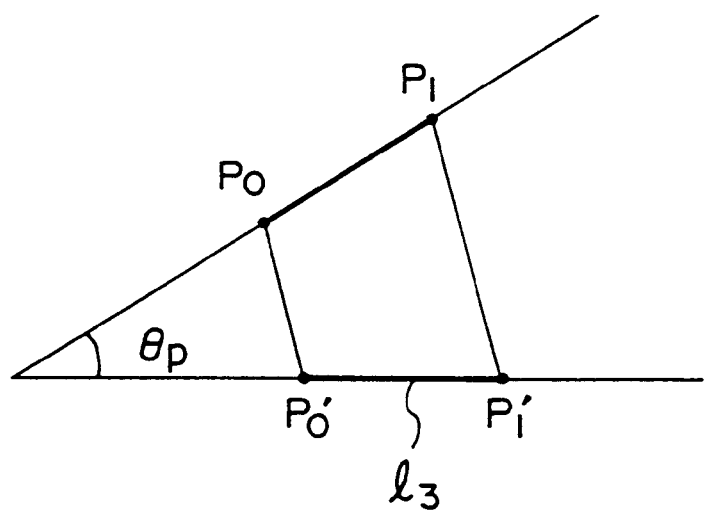
FIGS. 17A, 17B and 17C are illustrations for explaining a change in a length of a line in an image.
Figure 17B:
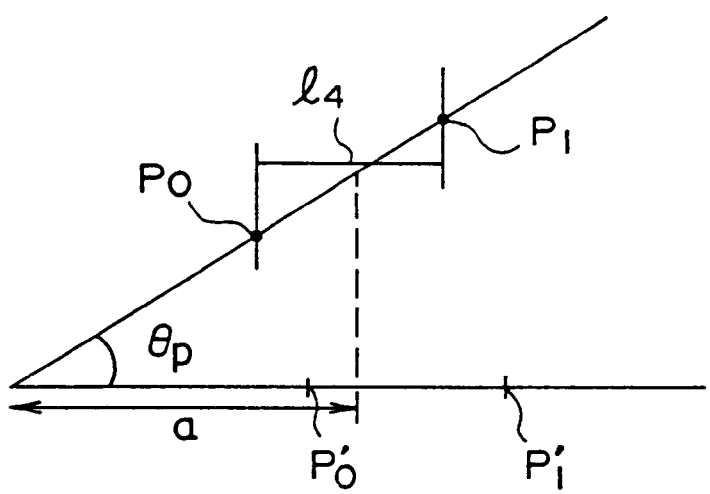
Figure 17C:
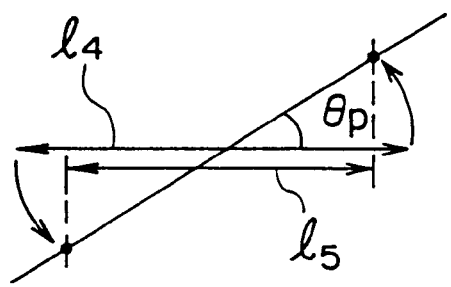

It is assumed that the heat points $P'_0$ and $P'_1$ having a distance $l_3$ therebetween move to $P_0$ and $P_1$ as shown in FIG. 17A. This is a transfer image by a change in the height and a rotation. The change in the height is regarded as a displacement of a line having a length $l_3$ to a position given by the points $P_0$ and $P_1$. The change in the image is represented by $L_3 \cdot (1 + \Delta h/h)$. The height $\Delta h$ is represented by $a \cdot \tan \alpha_P$ as shown in FIG. 17B since $\Delta h$ is a distance a (known value) from a center of rotation. Thus, the length $l_3$ is changed to a length $l_4 = l_3 \times \{1 + (a \cdot \tan \theta)/h\}$. Additionally, due to the pitching angle $\theta_P$, an object having the length $l_4$ is viewed as an object having a length $l_5 = l_4 \cdot \cos \theta_P$ as shown in FIG. 17C. That is, the length $l_5$ is represented as follows.

$$l_5 = l_3 \cdot \cos \theta_P \times \left(1 + \frac{a \cdot \tan \theta_P}{h}\right) \quad (8)$$

Similarly, a line having a length $l_6$ changes as a line having a length $l_7$ due to a roll angle $\theta_r$ and a distance b from a center of roll.

$$l_7 = l_6 \cdot \cos \theta_r \times \left(1 + \frac{b \cdot \tan \theta_r}{h}\right) \quad (9)$$

Generally, changes in the height, pitch and roll occur simultaneously as motion of the vehicle. Factors $d_h$, $d_p$ and $d_r$ for the changes in the lengths due to changes in the height of the vehicle, pitch and roll are represented as follows.

$$\left.\begin{aligned} d_h &= 1 + \Delta h / h \\ d_p &= \cos \theta_P \cdot (1 + (a \cdot \tan \theta_P)/h) \\ d_r &= \cos \theta_r \cdot (1 + (b \cdot \tan \theta_r)/h) \end{aligned}\right\} \quad (10)$$

If the value of each of a, b and h is known and the factors $d_h$, $d_p$ and $d_r$ are solved, $\Delta h$, $\theta_p$ and $\theta_r$ can be determined by the following equations, where $\phi = \tan^{-1}(h/a)$ and $\phi = \tan^{-1}(h/b)$.

$$\Delta h = (d_h - 1) \cdot h \quad (11)$$

$$\begin{aligned} d_p &= \cos \theta_P (1 + (a \cdot \tan \theta_P)/h) \\ &= \cos \theta_P + (a/h) \cdot \sin \theta_P \\ &= \sqrt{1 + (a/h)^2} \cdot \sin(\theta + \phi) \end{aligned}$$

$$\theta_P = \sin^{-1}\left(\frac{d_p}{\sqrt{1 + (a/h)^2}}\right) - \phi \quad (12)$$

$$\theta_r = \sin^{-1}\left(\frac{d_r}{\sqrt{1 + (a/h)^2}}\right) - \gamma \quad (13)$$

$$\gamma = \tan^{-1}(h/b)$$

Figure 18:
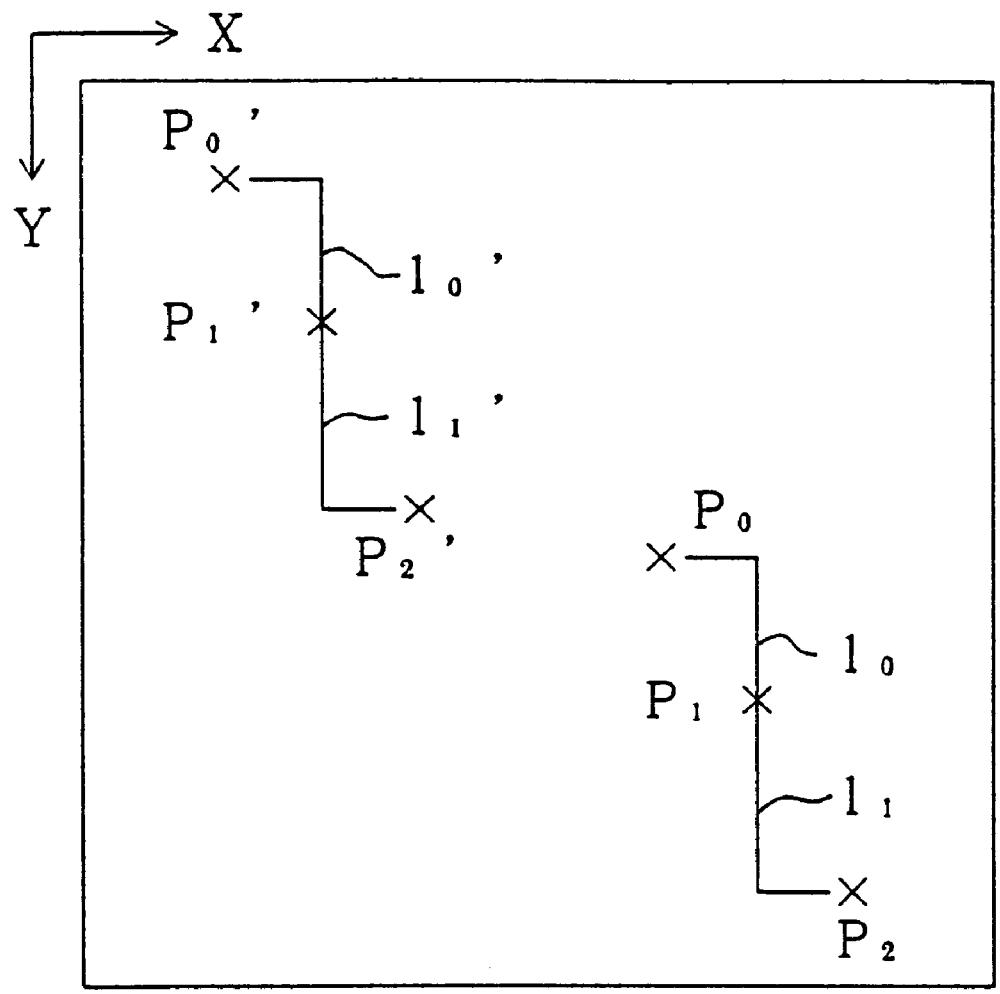
FIG. 18 is an illustration of a synthesized image in which three heat points are provided.

When three heat points $P_0$, $P_1$ and $P_2$ taken at the unit time interval $\Delta t$ are used, the change in the height, pitch and roll can be detected. In a synthesized image of two images shown in FIG. 18, points $P_0'$, $P_1'$ and $P_2'$ indicate positions of heat points on the image at the time $t_0$, and points $P_0$, $P_1$ and $P_2$ indicate positions of heat points on the image at the time $t_1$ when the unit time $\Delta t$ has lapsed from the time $t_0$.

In order to detect the pitch angle $\theta_p$ as pitch information, $l_0'$, $l_1'$, $l_0$ and $l_1$ are determined as follows.

$$l_0' = P_{1y}' - P_{0y}' \quad l_{1'} = P_{2y}' - P_{1y}'$$

$$l_0 = P_{1y} - P_{0y} \quad l_1 = P_{2y} - P_{1y}$$

In this case, the changes in the height of the vehicle and the roll during a time from $l_0'$ and $l_1'$ to $l_0$ and $l_1$ are common with each of changes from $l_0'$ to $l_0$ and from $l_1'$ to $l_1$. However, with regard to the pitch, the quantity of pitch is common, but the factor $d_p$ differs since a distance from the center of gravity varies. Thus, the pitch angle $\theta_p$ is obtained by the following procedures.

$$l_0' \cdot d_h \cdot d_r \cdot d_{p0} = l_0$$

$$l_1' \cdot d_h \cdot d_r \cdot d_{p1} = l_1$$

$$\therefore d_{p0} = \frac{l_0 \cdot l_1'}{l_0' \cdot l_1} d_{p1}$$

$$d_{p0} = \cos \theta_p + \frac{a_0}{h} \sin \theta_p$$

$$d_{p1} = \cos \theta_p + \frac{a_1}{h} \sin \theta_p$$

In the above equations, $a_0$ represents a known distance from the center between $P_{0y}$ and $P_{1y}$ to the center of gravity, and $a_1$ represents a known distance from the center between $P_{1y}$ and $P_{2y}$ to the center of gravity.

$$\therefore \left(1 - \frac{l_0 \cdot l_1'}{l_0' \cdot l_1}\right) \cos \theta_p + \left(\frac{a_0}{h} - \frac{l_0 \cdot l_1'}{l_0' \cdot l_1} \cdot \frac{a_1}{h}\right) \sin \theta_p = 0$$

$$1 - \frac{l_0 \cdot l_1'}{l_0' \cdot l_1} = A, \quad \frac{a_0}{h} - \frac{l_0 \cdot l_1'}{l_0' \cdot l_1} \cdot \frac{a_1}{h} = B$$

$$\sqrt{A^2 + B^2} \sin(\theta_P - \phi_P) = 0$$

$$\phi_P = \tan^{-1} \frac{B}{A}$$

Assuming $-90° < \theta < 90°$, the following equation is obtained.

$$\theta_P = -\phi_P = \tan^{-1}\frac{B}{a} \quad (14)$$

$$= -\tan^{-1}\left(\frac{1 - \frac{l_0 \cdot l'_1}{l'_0 \cdot l_1}}{\frac{a_0}{h} \cdot \frac{l_0 \cdot l'_1}{l'_0 \cdot l_1} - \frac{a_1}{h}}\right)$$

A determination of the roll angle $\theta_r$ as the roll information can be made by a procedure similar to the determination of the pitch angle. Since the direction of roll is the X-direction, $l_0'$, $l_1'$, $l_0$ and $l_1$ are defined as follows.

$$l'_0 = P'_{1x} - P'_{0x} \quad l_{1'} = P'_{2x} - P'_{1x}$$

$$l_0 = P_{1x} - P_{0x} \quad l_1 = P_{2x} - P_{1x}$$

By following a procedure similar to the procedure for obtaining the pitch angle, the roll angle $\theta_r$ is represented by the following equation.

$$\theta_r = \phi_r = -\tan^{-1}\left(\frac{1 - \frac{l_0 \cdot l'_1}{l'_0 \cdot l_1}}{\frac{b_0}{h} \cdot \frac{l_0 \cdot l'_1}{l'_0 \cdot l_1} - \frac{b_1}{h}}\right) \quad (15)$$

In the above equations, bo represents a known distance from the center between $P_{0x}$ and $P_{2x}$ to the center of gravity, and $b_1$ represents a known distance from the center between $P_{1x}$ and $P_{2x}$ to the center of gravity.

With regard to the change $d_h$ in the height of the vehicle, as the vehicle height information, $d_h$ is obtained by using one of equations $l_0' \cdot d_h \cdot d_r \cdot d_{p0} = l_0$ and $l_1' \cdot d_h \cdot d_r \cdot d_{p1} = l_1$.

$$d_h = \frac{l_0}{l'_0} \cdot \frac{1}{d_r \cdot d_{p0}} \quad (16)$$

$$= \frac{l_0}{l'_0} \cdot \frac{1}{\cos\theta_r \, [1 + (b \cdot \tan\theta_r)/h] \cdot \left(\cos\theta_P + \frac{a_0}{h} \cdot \sin\theta_P\right)}$$

It should be noted that the vehicle speed V and the moving direction θ are also influenced by the pitch and roll which influence must be eliminated. The center of the three points $P_0'$, $P_1'$ and $P_2'$ is defined as $P'=(P_x', P_y')$ and the center of the three points $P_0$, $P_1$ and $P_2$ is defined as $P'=(P_x, P_y)$.

$$P'_x = \frac{P'_{0x} + P'_{1x} + P'_{2x}}{3} \quad P_x = \frac{P_{0x} + P_{1x} + P_{2x}}{3}$$

$$P'_y = \frac{P'_{0y} + P'_{1y} + P'_{2y}}{3} \quad P_y = \frac{P_{0y} + P_{1y} + P_{2y}}{3}$$

$$l_x = P_x - P_x'$$
$$l_y = P_y - P_y'$$

$L_x$ and $L_y$ are defined as values which are obtained by eliminating the influence of the pitching and rolling.

$$L_x \cdot d_h \cdot d_r \cdot d_p = l_x$$
$$L_y \cdot d_h \cdot d_r \cdot d_p = l_y$$

$$L_x = \frac{l_x}{d_h \cdot d_r \cdot d_p}$$

$$L_y = \frac{l_y}{d_h \cdot d_r \cdot d_p}$$

From the above equations, the vehicle speed V and the moving direction θ after correction are represented by the following equations.

$$V = \sqrt{L_x^2 + L_y^2} \quad (18)$$

$$\theta = \tan^{-1}\frac{L_x}{L_y}$$

Figure 19:
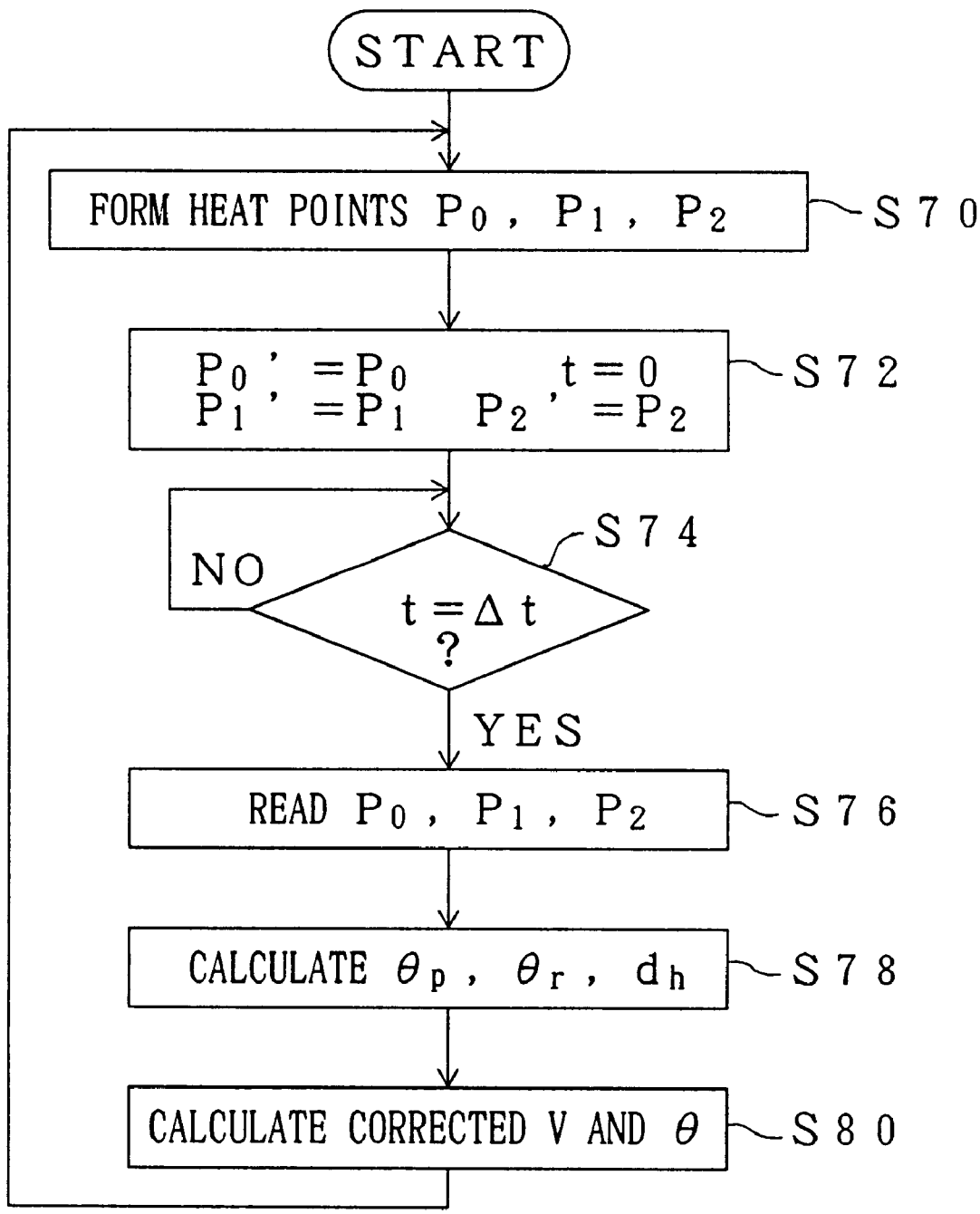
FIG. 19 is a flowchart of an operation performed by the ECU for calculating a quantity of vehicle motion based on the three heat points.

FIG. 19 is a flowchart of an operation performed by the ECU 12 for calculating the quantity of vehicle motion based on three heat points. In the figure, heat points $P_0$, $P_1$ and $P_2$ are formed, in step S70, by supplying a pulsed current to the laser beam source 10. Then, in step S72, image data is read from the infrared imaging element 20, and the X and Y coordinate values of the image of the heat points $P_0$, $P_1'$ and $P_2$ are stored as the data of the heat points $P_0'$, $P_1'$ and $P_2'$. At this time, the timer t is reset to zero.

Then, in step S74, a counting operation of the timer t is continued until the counted value of the timer t reaches the unit time Δt. When the counted value reaches the unit time Δt (t=Δt), the routine proceeds to step S76. In step S76, image data is read from the infrared imaging element 20, and the X and Y coordinate values of the image of the heat points $P_0$, $P_1'$ and $P_2$ are rendered to be the data of the heat points $P_0$, $P_1$ and $P_2$. In step S78, the pitch angle $\theta_p$, the roll angle $\theta_r$ and a quantity $d_h$ of the height of the vehicle are calculated by the equations (14), (15) and (16), respectively. Thereafter, in step S80, the vehicle speed V and the moving direction α are calculated by the equations (17) and (18) in which influences from $\theta_p$, $\theta_r$P and $D_h$ are eliminated, and the routine returns to step S70.

As mentioned above, a quantity of three-dimensional motion of the vehicle such as the vehicle height information, the pitch information and the roll information can be obtained from the changes in the positions of the three marks (heat points).

It should be noted that the interval of the pulses in the current for driving the laser beam source 10 may be constant, however, the interval of the pulses may be in inverse proportion to vehicle speed so that a distance between adjacent heat points is substantially equal, that is, the distance between adjacent heat points does not change when the vehicle speed is changed. Accordingly, even if the vehicle speed is increased, a plurality of marks can be formed within an area of the image taken by the infrared imaging element.

Additionally, although the marks (heat points) are formed by an infrared laser beam and the heat points are detected by the infrared imaging element in the above-menitoned embodiment, the marks may be formed by a visible laser beam and the marks may be detected by a visible light imaging element provided with an infrared filter. Further, the marks may be formed by providing a coloring agent onto a road surface by using an ink-jet apparatus. The marks may be detected by a visible light imaging device. Other than that, water may be applied to a road surface so as to provide marks which can be recognized by its reflectance or temperature.

The present invention is not limited to the specifically disclosed embodiments, and variations and modifications may be made without departing from the scope of the present invention.

What is claimed is:

1. A detecting apparatus for detecting a quantity of vehicle motion, said detecting apparatus being provided on a vehicle, said detecting apparatus comprising:

a marking mechanism for providing a mark on a road surface, said marking mechanism being provided on said vehicle;

an imaging device for taking images of the road surface including said mark at a first predetermined time interval;

calculating means for calculating the quantity of vehicle motion by detecting a change in a position of said mark during said first predetermined time interval based on a plurality of said images.

2. The detecting apparatus as claimed in claim 1, wherein said calculating means calculates information with respect to a vehicle speed and a moving direction of said vehicle based on a plurality of said images each of which includes at least said mark.

3. The detecting apparatus as claimed in claim 1, wherein said calculating means calculates information with respect to a spin and a revolution of said vehicle based on a plurality of said images each of which includes at least two marks.

4. The detecting apparatus as claimed in claim 1, wherein said calculating means calculates information with respect to a height, a pitch and a roll of said vehicle based on a plurality of said images each of which includes at least three marks.

5. The detecting apparatus as claimed in claim 1, wherein said marking mechanism includes a laser beam source which projects a laser beam onto the road surface so as to provide the mark on the road surface.

6. The detecting apparatus as claimed in claim 1, wherein said laser beam source is an infrared laser beam source which projects an infrared laser beam so as to provide a heat point as the mark, and said imaging device takes infrared images of the road surface including the heat point.

7. The detecting apparatus as claimed in claim 1, wherein said marking mechanism provides a plurality of the marks on the road surface at a second predetermined time interval which is changed in proportion to speed of said vehicle.

8. The detecting apparatus as claimed in claim 7, wherein said second predetermined time interval is decreased as the speed of said vehicle is increased.

* * * * *